United States Patent [19]

Herbenar

[11] 4,324,501
[45] Apr. 13, 1982

[54] JOINT ASSEMBLY

[75] Inventor: Edward J. Herbenar, Birmingham, Mich.

[73] Assignee: TRW Inc., Cleveland, Ohio

[21] Appl. No.: 82,281

[22] Filed: Oct. 5, 1979

[51] Int. Cl.³ .......................... F16C 11/00; F16D 1/12
[52] U.S. Cl. .................................... 403/133; 403/115; 403/135
[58] Field of Search ............... 403/132, 133, 115, 116, 403/135, 144, 125

[56] References Cited

U.S. PATENT DOCUMENTS

| | | | |
|---|---|---|---|
| 703,899 | 7/1902 | Debes | 403/140 X |
| 1,409,931 | 3/1922 | Crowell | 403/140 |
| 1,971,184 | 8/1934 | Hufferd et al. | |
| 3,238,602 | 3/1966 | White | |
| 3,667,789 | 6/1972 | McNeely et al. | 403/128 |
| 3,999,870 | 12/1976 | Clark et al. | 403/132 X |
| 4,231,673 | 11/1980 | Satoh et al. | 403/135 |

FOREIGN PATENT DOCUMENTS

| | | | |
|---|---|---|---|
| 1043834 | 11/1958 | Fed. Rep. of Germany | 403/115 |
| 2234338 | 7/1972 | Fed. Rep. of Germany | |
| 2244645 | 9/1972 | Fed. Rep. of Germany | |
| 932103 | 8/1960 | United Kingdom | |

*Primary Examiner*—Wayne L. Shedd
*Attorney, Agent, or Firm*—Yount & Tarolli

[57] ABSTRACT

A joint assembly has a member disposed within and movable relative to a housing from a first position through an intermediate position to a third position. A bearing member located between the movable member and the housing cooperates with the movable member and housing to provide a relatively low frictional force opposing movement of the movable member from the first position to the intermediate position. The bearing member also cooperates with the movable member and housing to provide a relatively large frictional force opposing movement of the movable member from the intermediate position to the third position. The bearing member preferably is laminated and has inner and outer surfaces formed of different materials.

1 Claim, 4 Drawing Figures

JOINT ASSEMBLY

BACKGROUND OF THE INVENTION

Ball and socket joints are widely used in motor vehicles, particularly in automobile suspensions and steering linkages. Because of the relatively large number of joints that are used, considerable effort has been made to improve the effect of ball and socket joints on vehicle ride and handling characteristics.

Especially in a lightweight vehicle, ride and handling are improved if the vehicle's suspension or steering linkage offers a relatively small resistance to movements of the vehicle caused by small irregularities in a roadway. The bouncing or rebounding movements caused by large irregularities in a roadway, however, must be controlled by shock absorbers assisted by other components of the suspension and by the steering linkage. The joints, particularly ball and socket joints, incorporated in vehicle suspensions and steering linkages both permit and resist movements of the vehicle caused by roadway irregularities. Consequently, such joints should preferably offer both a relatively low resistance to small movements and a relatively high resistance to larger movements.

Joints previously proposed for vehicle suspensions or steering linkages have not provided dual levels of resistance to movements. For example, U.S. Pat. No. 3,667,789 describes and illustrates a ball and socket joint in which an annular frustospherical bearing insert is interposed between the outer frustospherical surface of a ball element and the adjacent inner frustospherical surface of a socket. The ball element is integral with a short stud that projects through the central opening in the bearing insert and through an aligned opening in the socket. The outer diameter of the stud is smaller than the diameter of the opening in the insert, which, in turn, is smaller than the diameter of the opening in the socket.

The ball and stud combination, or ball stud, of the '789 patent can rotate and tilt relative to both the bearing insert and the socket. In addition, the ball stud and insert can rotate and tilt together relative to the socket. Movement of the ball stud and insert together occurs when the stud strikes the edge of the insert during tilting or rotational movement. The insert may then be forced to move with the ball stud relative to the socket. Despite the possibility of relative motion between the ball stud and either the bearing insert and socket together or the socket alone, the resistance to movement remains constant regardless of the type of movement. This is because the socket, the bearing insert, and the ball element of the ball stud are all made of a ferrous metal. Consequently, the coefficients of friction and the resulting frictional forces or resistances to movement developed between abutting surfaces of the three components will all be substantially identical.

Another ball and socket joint that may be used in a vehicle steering or suspension system is described and illustrated in U.S. Pat. No. 3,238,602. A bearing liner or insert for the joint is laminated and includes a radially inner spherical layer of low friction material, a radially outer backing layer of relatively rigid material, and an intermediate layer of material for bonding the low friction material to the backing layer. The low friction layer of the bearing insert abuts the spherical outer surface of the ball of a ball stud. As a result, the frictional resistance to movement between the ball and the insert is relatively low. The backing layer of the insert, on the other hand, is made of metal and abuts a metal surface of the socket. Consequently, the frictional resistance to movement between the bearing insert and the socket is high.

Despite the inclusion of a laminated bearing insert with surfaces formed of different materials, the joint of the '602 patent will not provide two levels of resistance to movements. The patent intends that the bearing insert should not move relative to the socket and proposes welding as a method of positively securing the insert to the socket. Even if the insert is not welded to the socket, however, it is highly unlikely that movement will occur between the two components. At any point where the stud of the joint's ball stud contacts the edge of the bearing insert, the stud also contacts an adjacent edge of the socket. Tilting motion of the ball stud thus could not force movement of the insert relative to the socket. Without movement between the insert and the socket, there cannot be two different levels of resistance to movements permitted and experienced by the joint.

U.S. Pat. No. 703,899 describes and illustrates a ball and socket joint used to connect an arm or leg to the body of a doll. A spherically shaped bearing insert, which is made of an elastic material, is interposed between the ball and the socket of the joint. In one embodiment of the joint, the ball can tilt relative to the bearing insert and the socket together or the ball and insert can tilt together relative to the socket alone. Despite the two possible methods of accommodating tilting motion between the ball and the socket, there should be no difference between the resistances to movement. The coefficient of friction between the ball and the insert should be approximately the same as the coefficient of friction between the insert and the socket.

SUMMARY OF THE INVENTION

The present invention relates to a joint that may be used in a vehicle steering or suspension system and that can provide two levels of resistance to movements accommodated by the joint. According to the invention, a joint comprises a first member that includes a housing and a second member at least partially received in the housing such that relative movement is permitted between the housing and the second member. The housing and the second member are movable from a first orientation relative to each other to a second, intermediate orientation to a third relative orientation. A bearing member is disposed in abutting engagement with both the housing and the second member for providing, in cooperation with the housing and the second member and in response to forces tending to produce relative movement between the housing and the second member, two different frictional forces that oppose the relative movement. A first frictional force opposes relative movement between the housing and the second member from their first relative orientation to their second orientation. A second frictional force opposes relative movement between the housing and the second member from their second orientation to their third orientation.

The two different frictional forces can be obtained by using a bearing member that is laminated. Such a bearing member includes two laminations or layers that provide two surfaces that have different coefficients of friction. The layers or laminations may be formed, for example, from a metal and a polymeric material, respectively. Because the bearing member has two surfaces with different coefficients of friction, there can be a relatively high frictional resistance to movement between the bearing member's outer lamination, for example, and the housing for the joint. Similarly, there can be a relatively low frictional resistance to movement between the bearing member's inner lamination and the second member. By permitting the second member to tilt relative to both the housing and the bearing member during movement from the first relative orientation to the intermediate orientation, the resistance to movement is determined by the coefficient of friction between the second member and the bearing member and is relatively low. By then requiring the second member and the bearing member to tilt together relative to the housing during movement from the intermediate orientation to the third orientation, the resistance to the movement is controlled by the coefficient of friction between the bearing member and the housing and is relatively high.

In a preferred embodiment of the invention, the joint is a ball and socket joint. The ball of the joint is tiltable relative to the socket from a first position through an intermediate position to a third position. As the ball moves from the first position to the intermediate position, a polymeric inner layer or shell of a laminated bearing member cooperates with the ball in such a manner as to produce a first frictional force opposing the tilting movement. As the ball moves from the intermediate position to the third position, a metal outer layer or shell of the bearing member cooperates with the socket in such a manner as to produce a larger frictional force opposing tilting movement. The result is a change in the force opposing movement of the ball in tilting movements from the first position to the third position.

BRIEF DESCRIPTION OF THE DRAWINGS

For a better understanding of the invention, reference may be made to the following description of an exemplary embodiment, taken in conjunction with the figures of the accompanying drawings, in which.

DESCRIPTION OF EMBODIMENT

Figure 1:
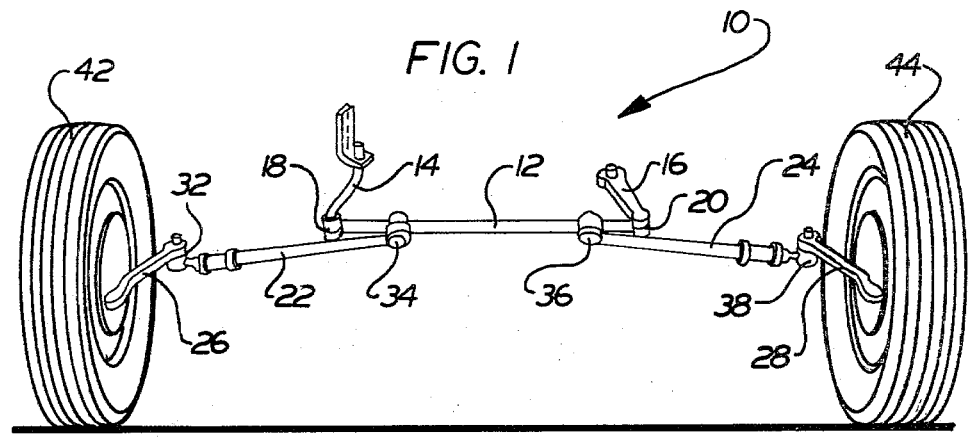
FIG. 1 is a schematic illustration of a steering system having a ball and socket joint in accordance with the invention.

Although a ball and socket joint constructed in accordance with the present invention can be used in association with either a vehicle suspension or steering linkage, the joint will be described as a component of a steering linkage 10 which is illustrated in FIG. 1. The automotive steering linkage 10 includes a center link 12 that is connected at its opposite ends to an idler arm 14 and to a pitman arm 16 by ball and socket joints 18 and 20, respectively. Adjacent to, but inboard of the ends of the center link 12, tie rods 22 and 24 are connected to the link by ball and socket joints 34 and 36, respectively. Tie rod 22 is also connected to a wheel bracket 26 by ball and socket joint 32, while tie rod 24 is connected to wheel bracket 28 by ball and socket joint 38. Turning to a steering wheel (not shown) for the vehicle causes movement of the pitman arm 16 and consequent movement of the other components of the linkage 10 to effect movement of the steerable vehicle wheels 42 and 44, which are mounted on the wheel brackets 26 and 28, respectively.

All of the ball and socket joints 18, 20, 32, 34, 36, and 38 are constructed in substantially the same manner and according to the invention. The joint 18 is further described and illustrated in FIGS. 2 through 4, therefore, as an example of the construction of all of the joints. Joint 18 comprises a ball stud 45 which incorporates a spherical ball 48 mounted at one end of a short, generally cylindrical stud or shank 46. The ball 48 may be either rigidly secured to the stud 46 or it may be formed in one piece with the stud. The stud 46 is tapered to engage a tapered hole in one of the components of the steering linkage 10. The stud 46 and the ball 48 are both preferably fabricated of a ferrous metal, such as steel.

The ball 48 of the ball stud 45 is received in a generally cylindrical metal socket or housing 50. At one end, the housing 50 has a shoulder that is turned radially inwardly and that provides an annular surface 54 defining an aperture or throat opening for the housing. The stud or shank 46 of the ball stud 45 projects through the aperture, while the ball of the ball stud 45 is positioned in a socket chamber to lie adjacent the housing shoulder. Around the aperture, the housing 50 has a smooth internal bearing surface 56. The surface 56 may be either a surface of the housing 50 or a surface of a bearing insert that fits within the housing. In either case, the surface 56 is a surface of a ferrous metal, such as steel.

Interposed between the bearing surface 56 of the housing 50 and the spherical outer surface 65 of the ball 48 is an annular laminated bearing member 52 that has a generally frustospherical shape. The bearing member 52 comprises two generally frustospherical layers or shells 58 and 60 that are concentric but of different diameters. The outer surface of the inner shell 60 is contiguous with and bonded to the inner surface of the outer shell 58 so that there will be no movement between the shells. The outer surface 61 of the shell 58 is smooth and spherical and is disposed in abutting engagement with the spherical bearing surface 56. Similarly, the inner surface 63 of the shell 60 is smooth and spherical and disposed in abutting engagement with the spherical outer surface 65 of the ball 48. The outer shell 58 is preferably fabricated of a ferrous metal, such as steel, while the inner shell 60 is preferably fabricated of a nonferrous, low-friction material, such as a polymeric material.

Adjacent the aperture defined by the surface 54 of the housing 50, the bearing member 52 has an annular surface 62 that is oriented generally radially relative to the ball 48. The surface 62 defines a circular throat or aperture in the bearing 52 which may be aligned with the aperture in the housing 50. The stud 46 of the ball stud 45 projects through both the aperture defined by the surface 62 of the bearing 52 and the aperture defined by the surface 54 of the housing 50.

Figure 2:
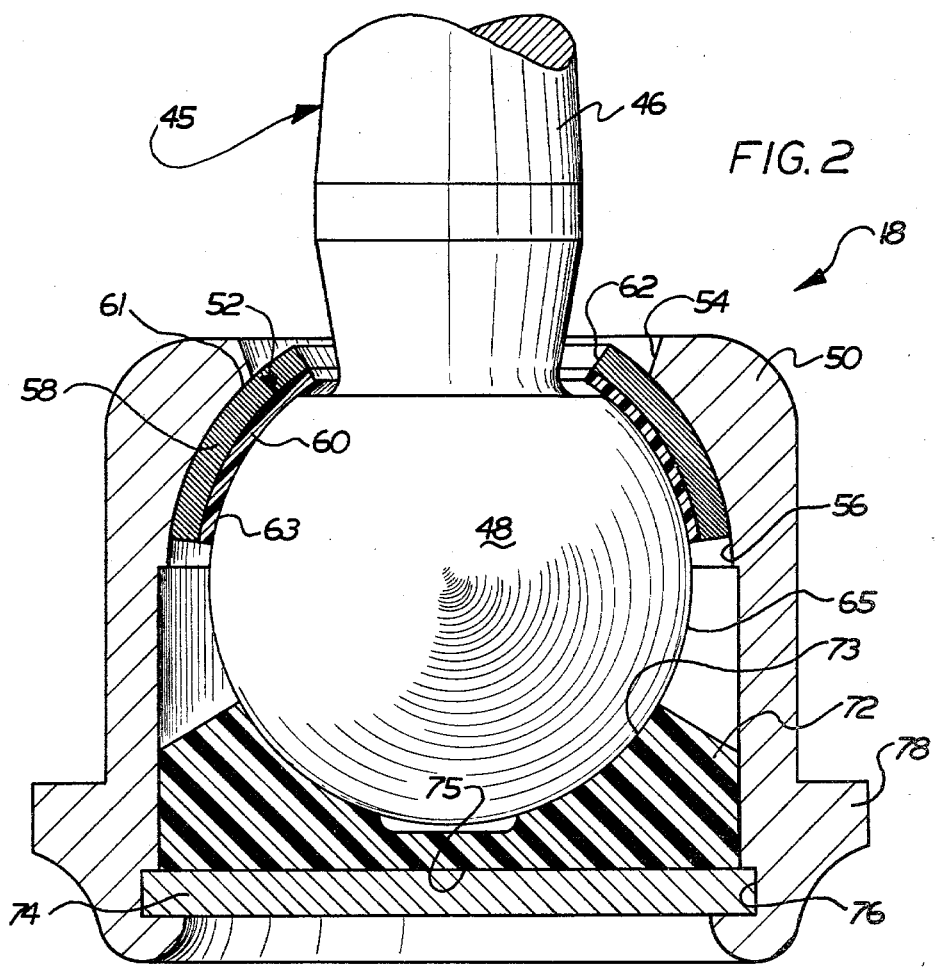
FIG. 2 is an enlarged sectional view of the ball and socket joint illustrating the relationship between the various components of the joint when the ball and socket are in a first relative orientation.

As illustrated in FIG. 2, the shank or stud 46 of the ball stud 45 is smaller in cross section than the throat defined by the surface 62 of the bearing member 52. Both the shank 46 and the throat of the bearing member 52 have cross sections that are smaller than the cross section of the throat of the housing 50. Thus, the ball stud 45 may move (e.g., tilt) independently of both the bearing member 52 and the housing 50. In addition, even though the shank 46 of the ball stud 45 may tilt into contact with the bearing member 52, there is still clearance for the ball stud 45 and the bearing member 52 to move together relative to the socket 50. While the shank 46 and the throat of the bearing member 52 are circular in cross section, the aperture or throat of the socket housing 50 may be either circular or oblong. If the housing throat is oblong, it is elongated in the direction of the primary or greatest intended sideways tilting movement of the shank 46.

To maintain the ball 48, the bearing member 52, and the housing 50 in intimate contact with one another, a cylindrical preload bearing 72 is inserted into the housing 50 at its end opposite the aperture defined by the surface 54. The bearing 72 has a spherically shaped surface 73 that is presented generally toward the spherical surface 63 of the bearing member 52 and mates with the spherical outer surface 65 of the ball 48. Opposite the spherical surface 73, the bearing 72 has a flat, circular surface 75 that abuts a circular end cap 74 for the housing 50. The preload bearing 72 is fabricated of a plastic material that is slightly compressible and has a high spring rate. Consequently, if the cap 74, which closes the end of the housing 50 opposite the aperture defined by the surface 54, is fitted tightly against the preload bearing 72, the bearing will be compressed and will exert a preload against the ball 48. The preload will force the ball into intimate contact with the bearing member 52 and the bearing member against the housing.

The ball stud 45, the bearing member 52, the housing 50, the preload bearing 72 and the end cap 74 are all fabricated separately. The joint 18 is assembled by placing the bearing member 52 in the housing or socket 50 through an opening in the end of the housing opposite the throat defined by the surface 54. The ball stud 45 is inserted into the housing such that the stud 46 projects through the apertures in the bearing member 52 and the socket 50. The preload bearing 72 is placed against the ball 48 of the ball stud 45 and the end cap 74 is placed against the bearing 72. The outer periphery of the cap 74 engages an annular groove that is formed in the interior circumferential surface of the housing 50. The end of the housing 50 is rolled over the outer edge of the end cap 74 to lock the cap against axial movement away from the housing 50. At the same time that the cap 74 is being locked in place, it is also being pressed against the preload bearing 72 to compress it and apply a preload against the ball 48 and the bearing member 52. The preload member 72, bearing member 52 and housing bearing surface 56 cooperate to support the ball stud 45 for rotational movement about a central longitudinal axis of the stud 46 and for tilting movement about the center of curvature of the ball 48.

In use, the ball and socket joint 18 may be mounted in the steering linkage 10 by forming the housing 50 at one end of a rod which constitutes one of the steering linkage components, such as the center link 12. A shoulder 78 that extends radially outwardly from the outer surface of the housing 50 helps to retain the housing in place in the steering linkage component. The stud 46 of the ball stud 45 is connected with a second component of the steering linkage 10, such as the idler arm 14. To protect the joint 18 against dirt and moisture, an elastomeric sealing boot (not shown) may enclose the stud 46 and the housing 50 adjacent the point where the stud projects from the housing. The housing 50 is of the type normally used in a suspension system and is shown as a component separate from the various arms and links of the steering linkage 10. However, the housing may also be formed in one piece with a component such as tie rod 22 or 24, for example, of the steering linkage 10.

When installed in the steering linkage 10, the joint 18 provides a relatively low resistance to relative rotation between the ball stud 45 and the housing 50 about an axis corresponding to the central axis of the stud 46. The low resistance to rotation permits greater ease in turning the vehicle wheels 42 and 44 and facilitates automatic return of the wheels to a straight ahead position. The joint 18 also provides a relatively low resistance to sideways tilting movement of the ball stud 45 relative to the housing 50 about the center of curvature of the ball, provided the tilting is through a relatively small angle. The low resistance to small tilting motions permits relatively easy motion between the ball stud 45 and the housing 50 in response to slight irregularities in a road surface over which the wheels 42 and 44 travel. The result will be relatively easy handling of a vehicle in response to slight road irregularities. When the irregularities in the road surface become larger, a vehicle in which the linkage 10 is installed will tend to respond to the irregularities with extreme bounce and rebound movements. To insure desirable handling characteristics when the road surface has large irregularities, a relatively high resistance to movement between the ball stud 45 and the socket 50 is required. Consequently, as the sideways tilting movements of the stud 46 increase beyond a relatively small angle from an initial or neutral position, the joint 18 provides a relatively high resistance to the tilting movement.

The desired change in the resistance to relative tilting motion between the ball stud 45 and the housing 50 is provided by the construction of and the interaction between the ball stud 45, the bearing member 52, and the housing 50. The cooperation between the three components can best be explained by reference to FIGS. 2 through 4 of the drawings. FIG. 2 shows the ball stud 45 and the housing 50 in a first or initial relative orientation or position. The shank 46 of the ball stud 45 has its central axis coaxial with the central axis of the housing 50 and with the central axis of the bearing member 52. Thus there is a radial clearance between the outer surface of the shank 46 of the ball stud 45 and the surface 62 of the bearing member 52. There is also a radial spacing between the surface 62 of the bearing member 52 and the surface 54 of the housing 50.

Figure 3:
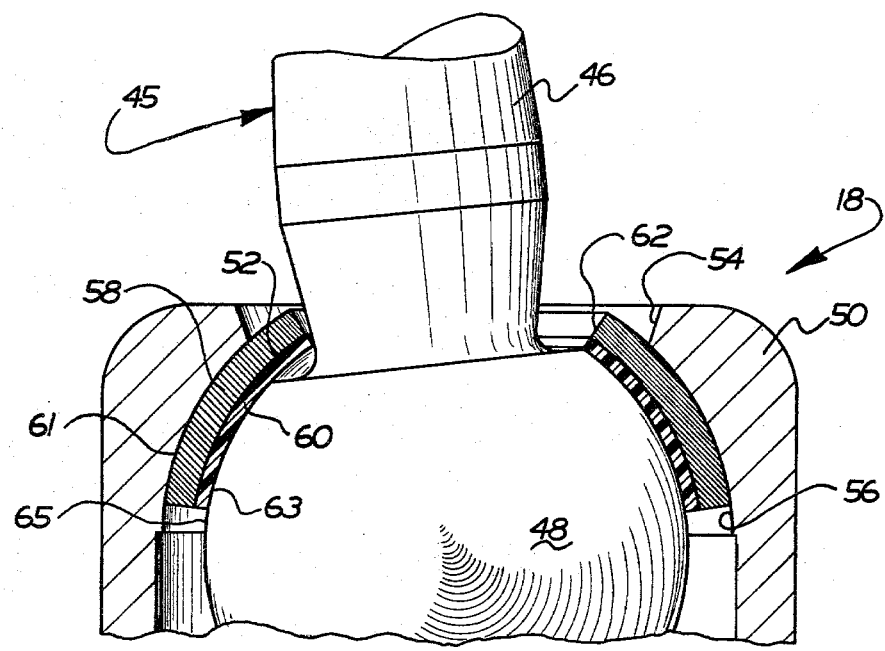
FIG. 3 is an enlarged sectional view illustrating the relationship between the various components of the joint when the ball has moved relative to a bearing member and the socket from the first relative orientation of FIG. 2 to an intermediate orientation.

When relative tilting movement is required between the ball stud 45 and the housing 50, the shank 46 and ball 48 of the ball stud tilt sideways from the position shown in FIG. 2 toward a second, intermediate position shown in FIG. 3. During the tilting movement, the spherical outer surface 65 of the ball slides on the inner surface 63 of the bearing member 52, but the bearing member does not move relative to the housing 50. The bearing 52 does not move relative to the housing 50 because the coefficient of friction between the metal outer surface 61 of the bearing and the metal surface 56 of the housing is greater than the coefficient of friction between the inner surface 63 of the bearing and the outer surface 65 of the ball 48. Thus, there is a relatively large frictional force resisting movement between the bearing 52 and the housing 50, while only a relatively small frictional force resists movement between the bearing and the ball 48.

When the ball stud 45 reaches the second or intermediate position illustrated in FIG. 3, the shank 46 of the ball stud 45 makes contact with the surface 62 that defines the throat of the bearing member 52. If additional sideways tilting movement of the ball stud relative to the housing 50 is required, the contact between the shank 46 and the surface 62 will cause the ball stud 45 and the bearing member 52 to move together relative to the socket housing 50. During this additional sideways tilting movement of the ball stud 45, the outer surface 61 of the bearing member is forced to slide on the surface 56 of the housing 50. The resulting frictional force, which resists the movement of the ball stud, is larger than the frictional force previously generated between the bearing member 52 and the ball 48.

Figure 4:
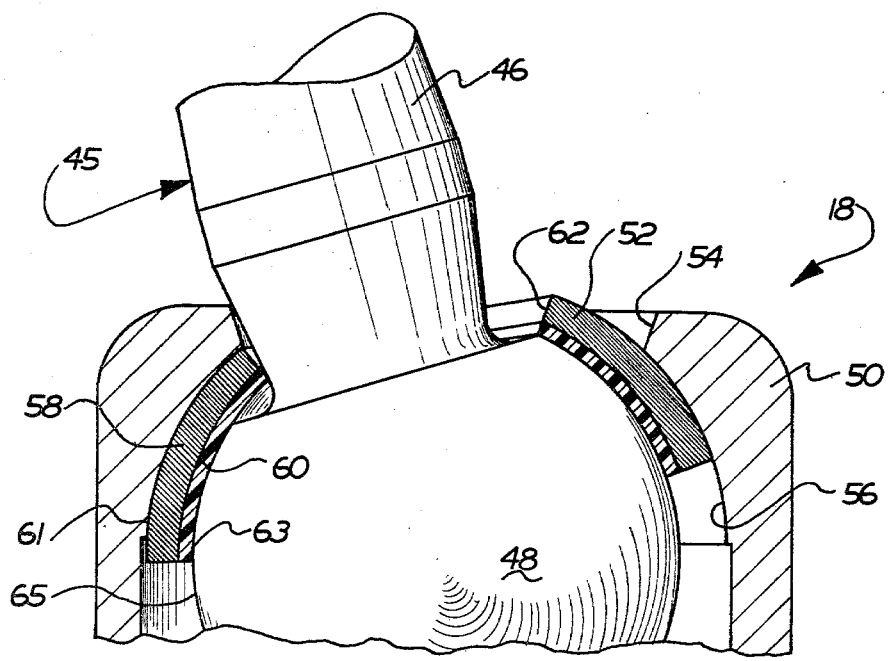
FIG. 4 is an enlarged sectional view illustrating the relationship between the various components of the ball and socket joint when the ball and bearing member of the joint have moved relative to the socket from the intermediate orientation of FIG. 3 to a third relative orientation.

The ball stud 45 can tilt sideways until the shank 46 of the ball stud contacts the surface 54 of the housing 50. When such contact occurs, as is illustrated in FIG. 4, the ball stud 45 cannot continue to move in the same direction relative to the housing 50. If additional sidways tilting movement of the ball stud 45 is demanded, the ball stud will attempt to pivot about its point of contact on the surface 54. Such pivoting will tend to force the ball 48 out of the housing 50 through the throat of the housing. To keep the ball in the housing 50, the diameter of the housing's throat should be as small as practical. At the same time, however, the diameter of the throat should be as large as possible in order to maximize the tilting movement permitted the shank 46 of the ball stud 45. Fabricating at least one shell 58 of the bearing member 52 from a relatively rigid material, such as a metal, permits the bearing member to cooperate with the housing to resist loads that tend to force the ball 48 out of the socket 50.

As should be apparent from the foregoing discussion, the frictional force resisting tilting movement of the ball stud 45 relative to the housing 50 changes during movement of the ball stud from the initial position or relative orientation shown in FIG. 2 to the final position or relative orientation shown in FIG. 4. A first relatively small frictional force resists sideways tilting movement of the ball stud 45 from the position or relative orientation shown in FIG. 2 to the position or relative orientation shown in FIG. 3. A second, larger frictional force opposes sideways tilting movement of the ball stud 45 from the position shown in FIG. 3 to the position shown in FIG. 4.

In addition to being able to tilt sideways relative to the housing 50, the ball stud 45 can rotate about the central axis of the stud 46. During such rotational movement, the ball 48 of the ball stud 45 will move relative to the bearing member 52 and the housing 50, while the bearing member will remain stationary relative to the housing. The bearing 52 remains stationary because the coefficient of friction between the metal outer surface 61 of the bearing member and the metal surface 56 of the housing is greater than the coefficient of friction between the inner surface 63 of the bearing member and the outer surface 65 of the ball 48. Thus, the force resisting movement between the bearing member 52 and the ball 48 is less than the force resisting relative movement between the bearing member and the housing 50. Movement occurs between the surfaces offering the lower frictional resistance.

The force required to effect sideways tilting and/or rotational movement of a ball stud relative to a housing in a joint will vary in accordance with the specific construction of the joint. For example, differences from joint to joint in the materials used to fabricate the ball, the bearing member, and the housing will affect the coefficients of friction between abutting surfaces of these components and will, in turn, affect the frictional forces developed. Similarly, differences in the total areas of contact will also affect the frictional forces generated. The difference in frictional forces or resistances which can be achieved through the use of different materials is illustrated by the results of tests conducted on ball joints of generally similar construction. The tests determined the torque required to move a metal ball relative to a metal seat and the torque required to move a metal ball relative to a seat fabricated of polymeric material. In the test, each ball and socket joint was subjected to a 1,500 pound load applied along the length of the ball stud in a direction away from the housing. Under this loading condition, the following torques were required to rotate and tilt the ball stud relative to the housing:

| Type of Motion | Joint with Steel-on-Steel Contact | Joint with Plastic-on-Steel Contact |
| --- | --- | --- |
| Stud rotation torque (foot pounds) | 9.3 | 2.9 |
| Stud sideways tilting torque (foot pounds) | 25 | 6.5 |

The differences between the torque values shown in the foregoing table result from the difference between the coefficient of friction developed between two steel surfaces and the coefficient of friction developed between a steel surface and a plastic surface. The illustrated ball and socket joint 18 includes both steel-on-steel sliding surfaces and plastic-on-steel sliding surfaces. In particular, the inner shell 60 of the bearing member 52 has a polymeric material surface 63 in abutting contact with a metal surface 65 of the ball 48, while the outer shell 58 has a steel surface 61 in contact with a steel surface 56 of the housing. As suggested by the representative values in the table, the resistance to movement will be three to four times greater between the bearing member 52 and the housing 50 than between the bearing member 52 and the ball 48.

Although one specific embodiment of the invention has been illustrated in the drawings and discussed above, other embodiments are possible. For example, the spherical bearing member 52 could be constructed with the polymeric shell 60 on the outside and the metal shell 58 on the inside. The polymeric material could also be applied to the bearing seat 56 or to the outer surface 65 of the ball 48. In the latter two embodiments, the bearing member 52 would consist solely of the metal shell 58. Bearing member 52 could also have an all-metal construction with a rough finish on one of its major surfaces and a smooth finish on its other major surface. Whether such a difference between the finishes would provide a sufficient difference in frictional resistance to have practical application is not clear, however.

In addition, while the invention has been illustrated in connection with ball and socket joints, the invention could be embodied in other types of joints. For example, the invention could be embodied in a cylindrical joint that would control axial and/or rotational movement of a shaft in a cylindrical journal. In such a joint, the bearing member would be tubular and projections would be formed on the shaft to engage the bearing member after a desired degree of axial or rotational movement. The shaft might be permitted to move axially relative to the bearing member and the journal through a predetermined distance until projections on the shaft contacted one end of the bearing member. The bearing member would then move axially with the shaft relative to the journal, but with greater frictional resistance to movement. Ultimately, the projections on the shaft would contact the journal, thereby prohibiting further movement between the shaft and the journal.

It should further be noted that in the illustrated embodiment of the invention, variation in the degree of movement that can be accommodated before a change occurs in the frictional resistance to movement can be achieved by varying the relationship between the diameter of the shank 46 of the ball stud 45 and the diameter of the throat of the bearing member. A similar variation in the maximum angle of tilting motion which can be accommodated can be achieved by varying the size of the throat in the housing. Proper selection of the three dimensions will permit a ball and socket joint to be "tuned" to a particular vehicle or steering linkage 10.

I claim:

1. A ball and socket joint having a relatively low resistance to rotation and to oscillation within a first portion of a range of oscillatory movement and a relatively high resistance to oscillation within a second portion of the range of oscillatory movement, said ball and socket joint comprising a metal socket housing having first surface means for defining a metal seat having the configuration of a portion of a sphere and second surface means for defining an opening in the housing extending through a central portion of the seat, a metal ball stud having a spherical head end with a center of curvature which is coincident with the center of curvature of said metal seat, said ball stud having a shank extending through the opening in said metal seat, said shank having a cross sectional area which is substantially smaller than the cross sectional area of the opening in said metal seat to accommodate oscillation of said shank through a relatively large range of movement prior to engagement of said shank with said second surface means, a movable bearing disposed between the outer surface of the spherical head end of said ball stud and said metal seat, said bearing including a movable one-piece metal shell having an outer side surface with the configuration of a portion of a sphere having a center of curvature which is coincident with the center of curvature of said metal seat, said bearing further including a one-piece inner layer of polymeric material connected with said metal shell for movement therewith relative to said socket housing, said inner layer having an inner side surface with the configuration of a portion of a sphere having a center of curvature which is coincident with the center of curvature of said metal seat, said bearing including third surface means for defining an opening extending through a central portion of said bearing, said opening through said bearing having an area which is substantially smaller than the area of the opening in said metal seat and which is substantially greater than the cross sectional area of said shank to accommodate oscillation of said shank through the first portion of the range of oscillatory movement without abutting engagement of said shank with said third surface means and to enable said shank and said bearing to move together through the second portion of the range of oscillatory movement after said shank has moved into abutting engagement with said third surface means and prior to abutting engagement of said shank with said second surface means, said polymeric inner layer of said bearing being disposed in abutting engagement with said spherical metal heat end of said ball stud and having a relatively low coefficient of friction to provide a relatively low resistance to rotation of said ball stud about a central axis of said shank and to provide a relatively low resistance to oscillation of said ball stud through the first portion of the range of oscillatory movement, said metal shell of said bearing being disposed in abutting engagement with said metal seat and having a relatively high coefficient of friction to provide a relatively high resistance to oscillation of said ball stud through the second portion of the range of oscillatory movement, and a preload bearing disposed between said socket housing and said spherical head end of said ball stud at a location which is opposite from said shank when said ball stud is in a central portion of the range of oscillatory movement, said preload being including surface means disposed in abutting engagement with the head end of said ball stud to urge the head end of said ball stud toward said seat.

* * * * *

UNITED STATES PATENT AND TRADEMARK OFFICE
CERTIFICATE OF CORRECTION

PATENT NO. : 4,324,501
DATED : April 13, 1982
INVENTOR(S) : Edward J. Herbenar

It is certified that error appears in the above–identified patent and that said Letters Patent are hereby corrected as shown below:

Column 10, line 43, change "being" to --bearing--.

Signed and Sealed this

Twenty-third Day of November 1982

[SEAL]

Attest:

GERALD J. MOSSINGHOFF

Attesting Officer      Commissioner of Patents and Trademarks